United States Patent [19]
Cascia

[11] Patent Number: 6,000,067
[45] Date of Patent: Dec. 14, 1999

[54] AUTOMATIC LIQUID CHEMICAL ADDITIVE DISPENSER FOR RECREATIONAL VEHICLE TOILETS

[76] Inventor: Frank J. Cascia, 2415 White Goose Rd., Campo, Calif. 91906-1457

[21] Appl. No.: 09/056,278

[22] Filed: Apr. 7, 1998

[51] Int. Cl.⁶ .................................................. E03D 9/02
[52] U.S. Cl. ..................................... 4/223; 4/224; 4/222
[58] Field of Search ........................... 4/223, 224, 222, 4/225.1, 226.1, 227.1

[56] References Cited

U.S. PATENT DOCUMENTS

| | | | |
|---|---|---|---|
| 4,262,372 | 4/1981 | Ryder | 4/222 |
| 4,841,578 | 6/1989 | Mercer | 4/224 |
| 4,873,727 | 10/1989 | Homan | 4/226 |
| 5,142,707 | 9/1992 | Prue | 4/222 |

Primary Examiner—David J. Walczak

[57] ABSTRACT

An adapter for automatically dispensing any aromatic, deodorizing, cleansing, sanitizing fluid directly into the bowl of a recreational vehicle toilet as a result of operating either the bowl rinse or the bowl flush control. An apparatus adapted to toilets installed in recreational vehicles, travel trailers, an marine craft. Because it passively senses the presence of toilet inlet rinse water flow, the apparatus achieves its objective without making modifications to, and is totally independent of, the RV plumbing system. The adapter utilizes an electronic control unit which employs the electrically conductive property of water to detect the flush and the refill operations of the RV toilet. Upon detecting fresh water entering the toilet, the electronic control unit energizes an electric solenoid valve which releases a metered amount of chemical additive fluid directly into the toilet bowl. The chemical additive flow rate is fully adjustable by the user, and the chemical fluid reservoir is refillable.

12 Claims, 3 Drawing Sheets

AUTOMATIC LIQUID CHEMICAL ADDITIVE DISPENSER FOR RECREATIONAL VEHICLE TOILETS

BACKGROUND

1. Field of Invention

This invention relates to an adapter for automatically dispensing any type of scented, colored, cleansing or disinfecting liquid chemical directly into the bowl of a toilet installed in a recreational vehicle (RV). The toilet would be a typical RV toilet connected to a pressurized fresh water supply. Such recreational vehicles include motorhomes, travel trailers and marine craft. This invention is adaptable to both existing RV toilets and newly purchased RV toilets.

2. Description of Prior Art

Contemporary RVs have toilet systems which retain their waste water inside large compartments called holding tanks. Usually, holding tanks are installed directly beneath the RV toilet, immediately under the toilet room deck. With the toilet situated directly above the holding tank, it can flush directly into the holding tank without the use of a soil trap, thereby using a minimum amount of water in the process. Usually there is merely a vertical soil pipe which carries the waste from the RV toilet to the holding tank. Holding tanks are normally large enough to store waste water for a long enough duration until the owner finds it convenient to release the waste at an approved sewage dumping facility.

Even though the implementation of holding tanks has been very successful, the addition of chemicals to a holding tank has always been necessary for deodorizing the holding tank and enhancing the decomposition of waste. There is a possibility of the holding tank interior getting soiled and smelly if the owner neglects to add the chemicals before using the RV toilet. Usually, the additive chemicals are pre-measured liquids or powders, and are sent to the holding tank by flushing them directly down the toilet. In other instances, the owner needs to measure an amount of chemical before flushing it down the toilet. Sometimes, the RV gets used only for a small outing and then much of the chemical gets wasted from subsequent emptying of the holding tank when returning home.

Understandably, holding tanks can produce noxious odors which will migrate upward through the toilet bowl and into the RV interior spaces. However, RV toilets are internally constructed to seal shut at the base of the toilet bowl, thereby sealing off odors from the holding tank. Commonly, RV owners take advantage of the toilet's ability to seal at its base by leaving a preferred amount of water in the bowl. The ability of the RV toilet bowl to be prefilled with fresh water, much like a common household toilet, continues to give rise to the possibility of having colored, deodorized water standing in the bowl. Chemically-treated fresh water in the bowl of an RV toilet contributes to deodorizing both the RV toilet and bathroom. The same chemical additive would then enhance the overall treatment of waste in the holding tank. An understanding of the primary differences between household toilets and RV toilets will yield an appreciation as to why chemically treated additives in RV toilet bowls are not commonly found.

RV toilets are usually fitted with a combination-control lever which allows the option of either pre-filling the toilet bowl with the desired amount of water, or the dual-action of releasing toilet waste to the holding tank while allowing inlet-fresh water to rinse the toilet bowl. Because they are water frugal devices, RV toilets are not fitted with flush-water tanks behind the bowl as found on household toilets.

The existence of flush-water tanks has made the use of water coloring, deodorizing and sanitizing chemicals convenient and safe for household toilets. By design, household toilet flush-water tanks maintain a safety air-gap between the water standing in the flush-water tank and the water in the supply line which prefills the tank. The air-gap, along with an overflow tube which dumps excess water directly to the toilet bowl, ensures against the possibility of chemical additives back-flowing into the household fresh water supply lines. Chemicals readily usable in household toilet flush-water tanks are found in dissolvable cake or tablet form.

Since RV toilets are not designed with flush-water tanks, such tank-installed chemical accessories for pre-deodorizing, coloring, and sanitizing toilet flush water are not employable. Consequently, with the absence of a flush-water tank, prefilling the RV toilet bowl with aromatic, colored, sanitizing chemicals has been a challenge to inventors.

Prior art remedies have mainly focused on the insertion of chemical additives into the water carried by the RV toilet inlet plumbing. The most popular technique has involved the use of chemical-mixing canisters which become pressurized by the RV fresh water supply line. Using the technique of inserting chemicals into the toilet water inlet line gives rise to the danger of chemical contamination of the RV fresh water supply. To counteract this possibility, prior art inventions have made use of one-way check valves installed in the fresh water supply tubing, upstream of the chemical canister. However, the eventual failure of the one-way check valve, due to hard water buildup and degradation of internal one-way check valve components, could cause serious physical harm to the RV occupants.

The crafty implementation of combining a safety air-gap as found in household toilet flush-water tanks, along with the additional safety assurance of a one-way check valve is exhibited in U.S. Pat. No. 4,841,578 issued to Mr. Al Mercer (1989). Unfortunately, his invention requires severing the toilet inlet water line and installing a bulky, multi-functional canister and trap assembly. Usually, RV bathrooms are small and space for such bulky components is seldom available; especially behind the toilet.

Another respectable invention which inserts chemical additives into the water entering the toilet is presented in U.S. Pat. No. 4,262,372 awarded to Donald F. Ryder (1981). Mr. Ryder's invention is typical of prior art which modifies the plumbing system and specifies the installation of a one-way check valve to keep the chemical concentrate from contaminating the RV fresh water source.

Also of merit, is U.S. Pat. No. 4,873,727 awarded to Donald A. Homan (1989) which exhibits a variation of the chemical mixing chamber. As usual, his chemical mixing chamber is installed into the toilet water inlet line. Mr. Homan's invention also utilizes a variety of one-way check valve referred to as an "anti-siphon valve". In this application, the anti-siphon valve is used as a performance enhancement rather than that of safety. Mr. Homan's invention was designed strictly for a marine toilet using sea water for its flush cycle, making a safety-check valve unnecessary. In addition to being limited to marine use, Mr. Homan's invention shares limitations in common with those of Mr. Mercer's and Mr. Ryder's.

All prior art cited utilize a variety of mixing containers which allow the combining of toilet flush water with concentrated chemicals. Unfortunately, this technique will produce non-linear concentrations of additive throughout the life cycle of each chemical replenishment, and is the effect of continued dilution of the chemical by water passing through the canister.

A later patent, U.S. Pat. No. 5,142,707 awarded to Frederick Prue (1992), specifies the installation of a chemical injection unit with numerous fluid gate valves. This invention is limited to marine craft toilets designed with salt-water flushing systems, requires through-hull component installations, and has many expensive, space-consuming parts.

Typical with all cited prior art is the lack of control offered to the toilet user. If, for example, the user finds the deodorization too strong, provisions for variably controlling the concentration of chemical additive are rarely furnished. Additionally, none of the prior art cited offers the convenience of a simple on/off switch.

Consequently, a new approach is needed for the design of an RV toilet chemical dispenser. Such an approach should make use of newer technology in fulfilling the above stated need for deodorizing, sanitizing, coloring, and generally treating toilet flush water in all classes of RVs.

OBJECTS AND ADVANTAGES

Several objects and advantages of the present invention are:

(a) to provide a chemical dispensing apparatus which will take advantage of electronically detecting the toilet flush operation, thereby offering complete installation without requiring modifications to the existing RV plumbing system or toilet;

(b) to provide a chemical dispensing apparatus which will offer complete dissociation from the vehicle's fresh water supply source, ensuring the impossibility of contaminating same;

(c) to provide a chemical dispensing apparatus which avoids utilization of pressurized components, anti-siphon, one-way check valves, fluid gate valves and vessel through-hull fittings;

(d) to provide a chemical dispensing apparatus which will offer simplicity in overall design, thereby yielding installation options such as liberal location of key component modules;

(e) to provide a chemical dispensing apparatus which will facilitate a user-adjustable flow-metering valve, providing a convenient means for adjusting the amount of liquid chemical discharged to the toilet bowl;

(f) to provide a chemical dispensing apparatus which will release a linear amount of non-diluted chemical, ultimately yielding a chemical concentration in the holding tank which is more proportionate to the actual amount of waste therein;

A further objective of this invention is not merely to improve upon prior art, which, by their design make modifications to, and consequently become part of the RV plumbing system. The present invention, however, presents a departure in both technology and approach from prior art in its objective of providing a safe, simple, inexpensive method of achieving a pleasant smelling RV toilet and bathroom. Still further objects and advantages will become apparent from a consideration of the ensuing description and drawings.

REFERENCE NUMERALS IN DRAWINGS

Figure 1:
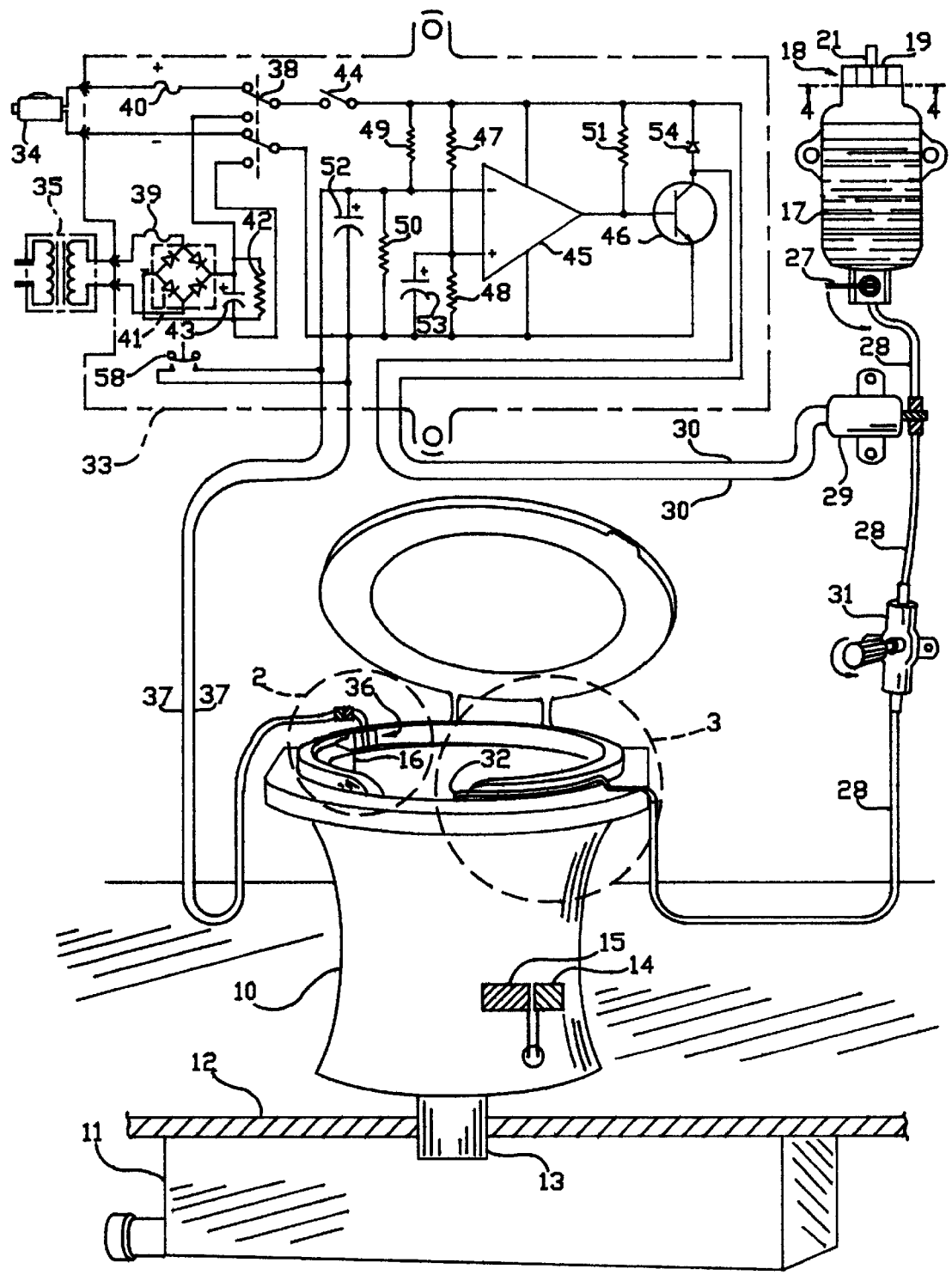
FIG. 1 is a perspective view of a conventional RV toilet mounted above a conventional RV holding tank with the invention installed as an apparatus adapted thereto.

10. RV toilet
11. holding tank
12. RV bathroom deck
13. soil pipe
14. rinse water lever
15. flush lever
16. rinse water aperture
17. fluid reservoir
18. refill cap assembly
19. refill cap
20. cap seal
21. cap extension
22. cap outer bleed port
23. cap inner bleed port
24. cap seal extension
25. seal extension bleed port
26. cap threads
27. fluid shut-off valve
28. fluid conduction tubing
29. flow-control solenoid valve
30. flow-control solenoid valve wires
31. flow-metering valve
32. bowl orifice
33. electronic control unit
34. dc voltage source adapter
35. ac voltage source adapter
36. rinse water detector assembly
37. rinse water detector assembly wires
38. power selection switch
39. ac fuse
40. dc fuse
41. full wave bridge rectifier
42. filter resistor
43. filter capacitor
44. power switch
45. integrated comparator amplifier
46. NPN switching transistor
47. bridge resistor
48. bridge resistor
49. bridge resistor
50. bridge resistor
51. transistor base bias resistor
52. electrolytic capacitor
53. electrolytic capacitor
54. diode
55. dual sensor probes
56. back-plate
57. rinse water detector assembly disconnect plug
58. fluid prime switch

SUMMARY OF THE INVENTION

The present invention is an apparatus adaptable to a conventional RV toilet which fulfills the above stated need. This apparatus makes no modifications to the RV toilet and, therefore, could be offered for adaption to both new RV toilets and to those toilets already in service.

Briefly described, the present invention is comprised of a refillable, vented fluid reservoir which holds enough liquid chemical additive to accommodate chemical treatment for numerous anticipated toilet flushes and bowl refills. The liquid chemical additive is then directed by transparently-walled flexible tubing to an electric solenoid valve which releases the liquid chemical additive to the toilet bowl by gravity feed.

This invention also incorporates an electronic control unit which features the ability to passively detect whenever the RV toilet bowl is getting either flushed or refilled. It does this by "feeling" the inlet-rinse water as it enters at the top of the toilet bowl, as the water passes over a pair of metallic sensor probes. The sensor probes are mounted on a flexible, adhesively backed, non-electrically conductive plate and are positioned adjacent to the inlet-rinse water aperture, near the top of the toilet bowl.

Upon sensing the electrical continuity of incoming fresh water, the dual sensor probes stimulate the electronic control unit which then energizes the electric solenoid valve. The electric solenoid valve permits chemical additive flow from the vented fluid reservoir, through flexible fluid conductive tubing, into a user-adjusted flow-metering valve. From the flow-metering valve, the fluid is conducted through more flexible tubing to the top of the toilet bowl and to a pre-formed orifice where the chemical additive makes a direct drop into the toilet bowl. The liquid chemical additive flows from the fluid reservoir to the RV toilet bowl solely by gravity feed.

DESCRIPTION—FIGS. 1 TO 5

A conventional recreational vehicle toilet installation is illustrated in FIG. 1. A typical RV toilet 10 flushes waste directly into a holding tank 11 through a segment of soil pipe 13. The holding tank is usually located directly beneath the RV bathroom deck 12. The present invention is also shown in FIG. 1 as an adapter to the conventional RV toilet 10 installation.

FIG. 1 reveals the present invention as an apparatus adapted to a conventional RV toilet 10. The present invention is shown installed without making modifications to the RV toilet 10. This invention involves the control of fluid flow by the force of gravity, thereby having no components or fluids under pressure.

Typically, an RV toilet has a dual-lever control which comprises a rinse water lever 14 and a flush lever 15. The rinse water lever 14 actuates a rinse water valve (not shown) which admits Pressurized fresh water into the toilet bowl through the water aperture 16, also shown enlarged in FIG. 2. The flush lever 15 operates a flush valve at the base of the toilet bowl (not shown) which releases waste directly to the holding tank 11 through the soil pipe 13. The dual-lever control 14 and 15 is operated either by means of foot pedals as shown, or is often mounted on the upper/back section of the toilet bowl as dual-hand control levers (not shown). The resultant toilet functions yielded from either foot pedals or hand control levers is identical.

Leading manufacturers of RV toilets have designed the rinse water lever 14 to operate independently of the flush lever 15 thereby allowing the user to prefill the toilet bowl to a desired level before use. Also in their design, the flush lever 15 not only releases waste to the holding tank 11 but this lever is engineered to group with the rinse water lever 14. Therefore, the rinse water lever 14 gets operated with either action of the toilet, i.e., either to prefill the bowl before use or to rinse the bowl during the flush operation. The ability to prefill the RV toilet bowl as if it were a common household toilet allows the RV toilet to retain preconditioned, deodorized water in the bowl.

Figure 4:
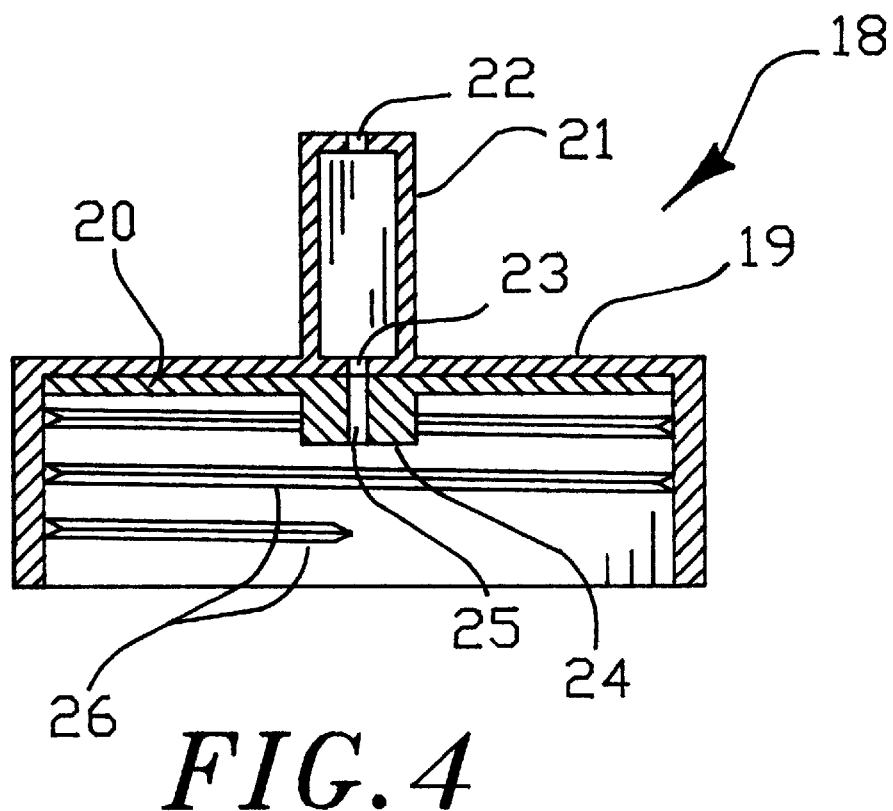
FIG. 4 is a cross-sectional view of the two-piece fluid reservoir refill cap assembly taken along line 4—4 of FIG. 1.
Figure 5:
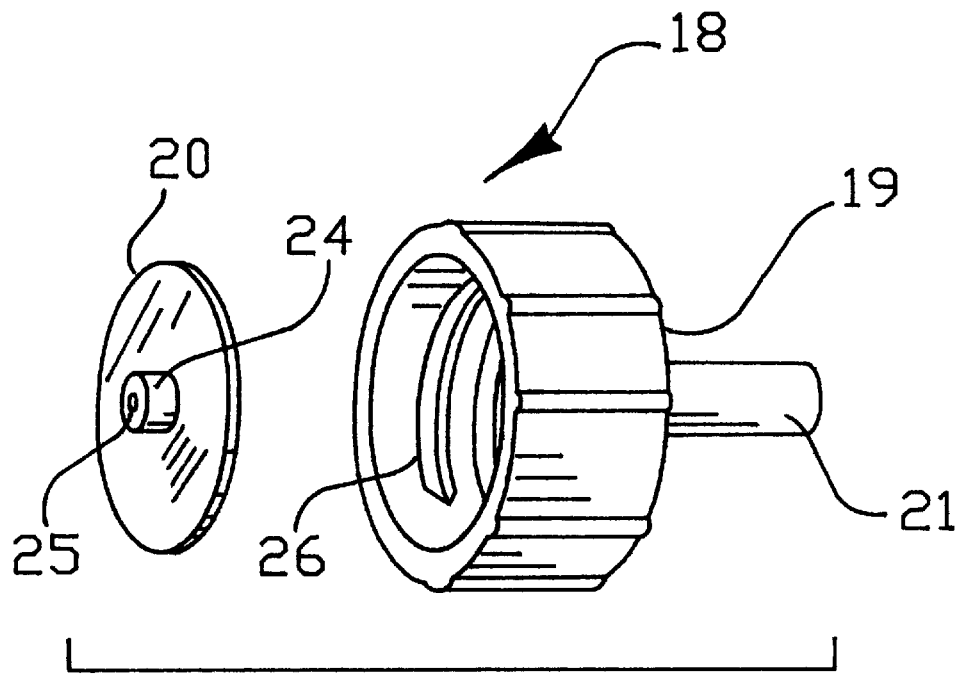
FIG. 5 is an exploded view of the fluid reservoir refill cap assembly.

Referring to FIG. 1, A fluid reservoir 17 provides containment of the liquid chemical additive of choice. The owner can select any of a variety of liquid toilet chemicals available at most RV accessory outlets. Additionally, the owner can pre-dilute the chemical to his satisfaction before filling the fluid reservoir 17. The fluid reservoir 17 can be provided in a variety of sizes, granted it is capable of holding enough liquid chemical additive to accommodate chemical treatment for numerous anticipated flushes and bowl refill operations. The fluid reservoir 17 is fabricated with drilled-hole flanges which provide a means for mounting on any flat vertical surface. The fluid reservoir 17 is bottle-neck shaped at its top which serves to dissipate fluid turbulence, thereby aiding containment of the chemical additive while the RV is in motion. A spin-off fluid reservoir refill cap assembly 18 is mounted atop the fluid reservoir 17 and consists of two pieces. Both pieces comprising the refill cap assembly 18 are detailed in FIG. 4 and FIG. 5. FIG. 4 is a cross-sectional view taken along line 4—4 of FIG. 1 and FIG. 5 is an exploded view. The refill cap assembly 18 consists of a refill cap 19 which is integrally formed with self-sealing threads 26 and a ventilating cap extension 21. The integrally formed, tubular, upwardly-directed, cap extension 21 of the refill cap 19 has a small hole drilled through each end of the cap extension as shown on FIG. 4, 22 and 23. These two holes serve as outer and inner cap bleed ports as they allow air to displace the liquid chemical additive as it leaves fluid reservoir 17. The bleed ports 22 and 23 also serve to equalize the air pressure inside the fluid reservoir with that of the outside, ambient air pressure. This action becomes necessary when the RV travels through elevation changes. Additionally, the cap extension 21 ensures fluid containment by dissipating fluid turbulence while providing air displacement to the fluid reservoir 17. Shown in FIG. 4 and FIG. 5, a cap seal 20, integrally is formed with a cap seal extension 24 which is directed downward, toward the reservoir contents, thereby presenting further attenuation to fluid turbulence. Having a drillway through its center 25, the cap seal extension 24 further ensures fluid containment while complementing air displacement for the fluid reservoir 17.

Referring to FIG. 1, the fluid reservoir 17 additionally comprises a manually operated fluid shut-off valve 27. The shut-off valve 27 is a simple 90 degree ball valve, integrally incorporated within the base of the fluid reservoir 17. The fluid shut-off valve 27 ensures containment of the liquid chemical additive for any maintenance event of the chemical dispensing apparatus.

The fluid reservoir 17 is preferably fabricated of transparent material, thereby facilitating immediate, effortless inspection of chemical additive fluid level. Fluid conduction tubing 28 conveys liquid chemical additive from the fluid shut-off valve 27 to the flow-control solenoid valve 29.

A flow-control solenoid valve 29 communicates chemical additive between the fluid reservoir 17 and the flow-metering valve 31. The flow-control 29 is an electrically operated, electromagnetically actuated, fluid control valve which provides the overall release of liquid chemical additive to the bowl of the RV toilet 10. The flow control solenoid valve 29 is commanded by the electronic control unit 33, by way of twin flow-control solenoid valve wires 30. The flow-control solenoid valve 29 is provided with drilled-holes flanges, thereby furnishing a means for mounting to any flat surface. Fluid conduction tubing 28 conveys liquid chemical additive from the flow-control solenoid valve 29 to the flow-metering valve 31.

The flow-metering valve 31 allows the owner to adjust the desired amount of liquid chemical additive released by the flow-control solenoid valve 29. The flow-metering valve 31 comprises a continuously adjustable, variably restricting fluid-conductive valve, thereby providing flow-rate control of liquid chemical additive released to the bowl of the RV toilet 10. The overall chemical additive flow rate is adjusted by the setting of a multi-turn knob on the flow-metering valve 31. If more aromatic treatment is desired, then the valve is set for a greater opening. The flow-metering valve 31 is surface mounted with drilled-hole flanges as said for the flow-control solenoid valve 29 and fluid reservoir 17. The flow-metering valve 31 communicates chemical additive fluid between the flow-control solenoid valve 29 and the bowl orifice 32.

Figure 3:
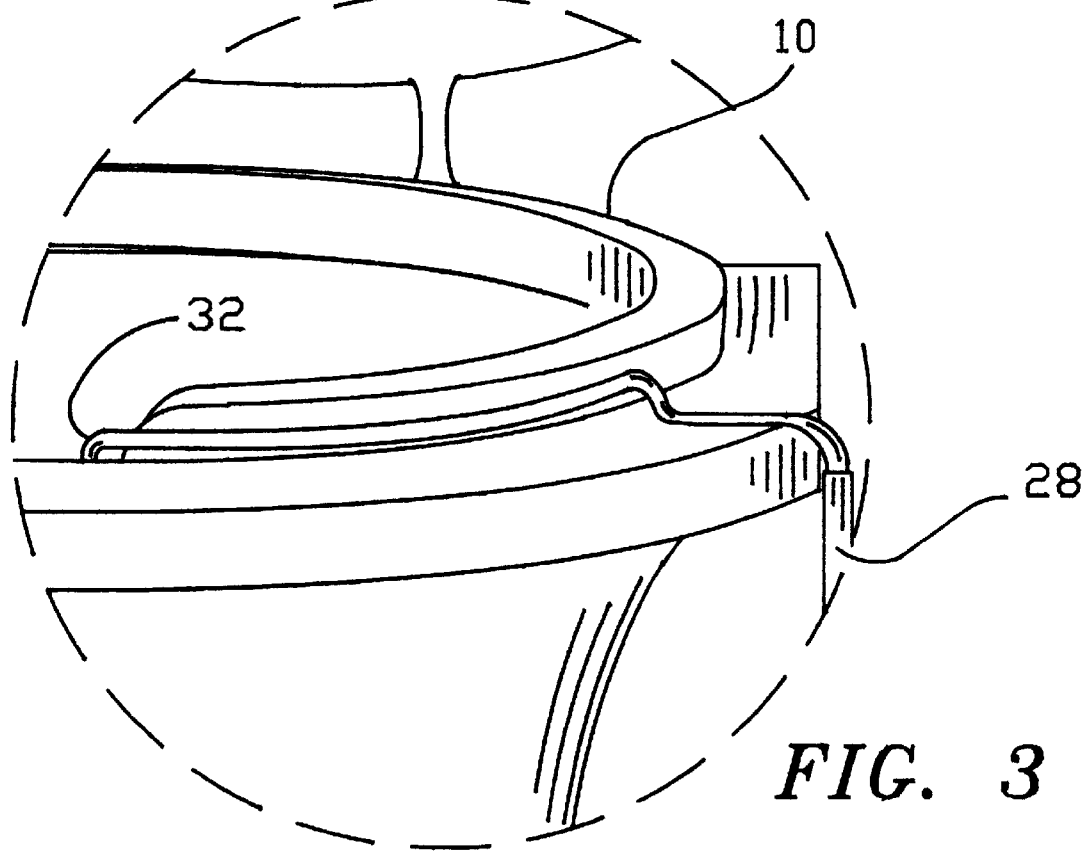
FIG. 3 is an enlarged view of the toilet portion of FIG. 1, wherein is shown the present invention toilet bowl orifice.

The bowl orifice 32, shown enlarged in FIG. 3, provides fluid release positioning of liquid chemical additive to the toilet bowl. FIG. 3 shows the bowl orifice 32 positioned at the bowl of the RV toilet 10. Positioning of the bowl orifice 32 is not critical, provided it is situated so as to emit the liquid chemical additive to the inside of the toilet bowl. The bowl orifice 32 is formed in order to direct the liquid chemical additive into the bowl, without making modifications to the RV toilet 10. The bowl orifice 32 can be provided as a pre-formed, adhesively backed entity to complement the contour of each RV toilet model. Additionally, the bowl orifice 32 can be provided as a formable orifice for contouring to the owner's satisfaction. Further, the bowl orifice 32 is preferably provided with an adhesively-backed mounting surface, thereby facilitating a simple installation without making modifications to the RV toilet 10.

An electronic control unit 33 provides activation and deactivation commands to the flow-control solenoid valve 29 via. twin solenoid wires 30. Depending upon whether water is flowing into the toilet through the rinse water aperture 16, the electronic control unit 33 makes the decision whether to energize the flow-control solenoid valve 29. Activation and deactivation of the flow control solenoid valve 29 is the result of the electronic control unit 33 responding to the detection of the flush and the refill operations of the RV toilet 10. The electronic control unit 33 employs electronic amplifying circuitry, whereby sufficient electrical energy is controlled for the activation and deactivation of the flow control solenoid valve 29. The electronic control unit 33 is powered by a choice of either a wall-plug-mounted 115 vac–12.6 vac transformer adapter 35 or by a wall-mounted cigarette lighter 12 vdc voltage source adapter 34. The electronic control unit 33 is provided a power selection switch 38 which selects either one source adapter or the other, thereby allowing the owner a choice of input power. The power selection switch 38 comprises a two-position, two-pole, electrical contact-switch. Both power sources are provided fuse protection by ac fuse 39 and dc fuse 40. The electronic control unit 33 circuitry requires only a simple full wave bridge rectifier 41 and resistor-capacitor filter 42 and 43 to convert the 12.6 vac to direct-current supply voltage. The electronic control unit 33 is fabricated with drilled-hole flanges which provide a means for mounting on any flat surface.

A power switch 44 is provided for delivering the direct-current voltage, as selected by the power selection switch 38, to the amplifying circuitry comprising the electronic control unit 33. The power switch is responsible for energizing the electronic control unit 33 active circuitry and may be used at any time to enable and disable the release of liquid chemical additive. The power switch 44 is a single-pole, two-position electric switch. Upon activation of the power switch 44, the electronic control unit 33 continually makes the decision whether to release chemical additive to the toilet bowl. The decision is based upon the output of an integrated comparator amplifier 45. Such a modern commercially available integrated comparator amplifier 45 is designed to operate from a single polarity supply source of a wide voltage range. Therefore, the main 12 vdc system incorporated in most classes of recreational vehicles provides an ideal source supply. A discrete component transistorized circuit in place of the integrated comparator amplifier 45 could also suffice as a decision making device. However, the high input impedance inherently designed into the integrated comparator amplifier 45 has led to its implementation for the present invention.

The electronic control unit 33 is also provided with an NPN switching transistor 46 which is directly driven by the integrated comparator amplifier 45, and is used to carry the electric current required by the flow-control solenoid valve 29.

The electronic control unit 33 employs four resistors arranged as a basic Wheatstone Bridge circuit which is connected across the circuit supply voltage. On one side of said bridge circuit, two resistors 47 and 48 of equal ohmic value share a common connection at the non-inverting input of integrated comparator amplifier 45. The voltage potential at the non-inverting input of the comparator amplifier 45, therefore, will nominally be equal to one-half the circuit supply voltage. The opposite side of said Wheatstone Bridge is comprised of two resistors 49 and 50, sharing a common connection at the inverting input of comparator amplifier 45. One of the two resistors 50 is of significantly greater resistance than the other 49, and is physically situated with one end at common voltage potential. A two-to-one resistance ratio for resistors 50 and 49 respectively will ensure a more positive voltage at the inverting input as compared to the non-inverting input of comparator amplifier 45. Typically, with an internal supply of 12vdc, the comparator amplifier 45 inverting input will have 8 vdc while 6 vdc will be at the non-inverting input. The nominal two-volt difference between the inputs will force an output from the comparator amplifier 45 toward zero volts, thereby keeping the NPN switching transistor 46 from conducting current to the flow-control solenoid valve 29.

Figure 2:
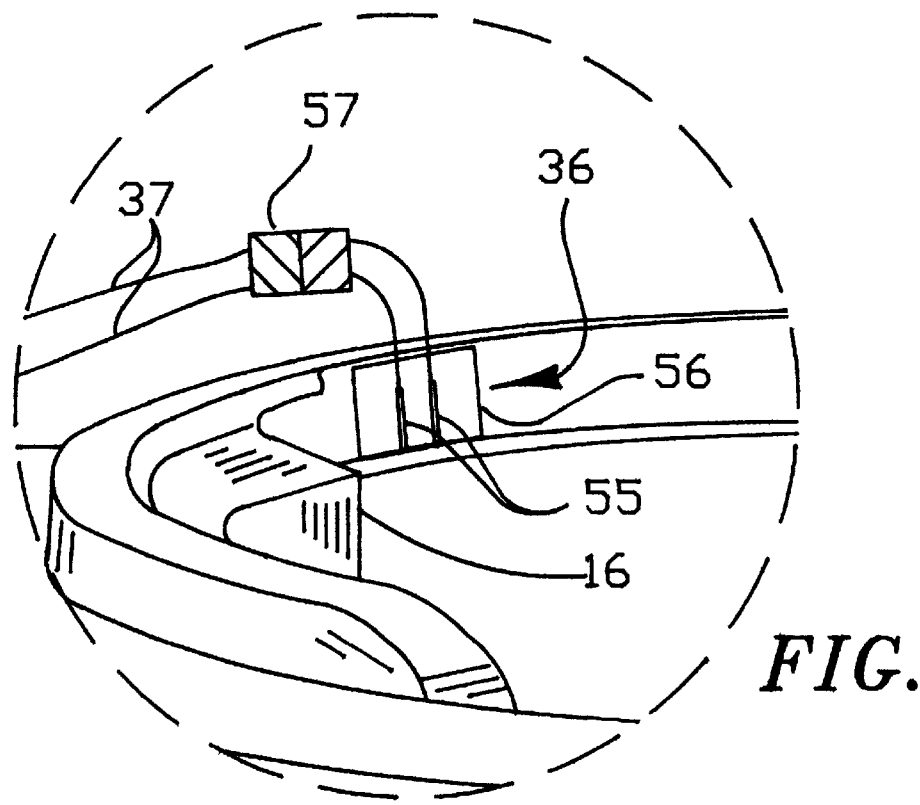
FIG. 2 is an enlarged view thereof, showing the region where bowl rinse water enters the conventional RV toilet.

With reference to FIG. 1 and FIG. 2, the Wheatstone Bridge resistor component 50 can be seen shunted by the rinse water detector assembly 36 via. associated wires 37. The rinse water detector assembly 36 is responsible for detecting the flush and the refill operations of the RV toilet 10. The operation of the rinse water detector assembly 36 is dependent upon the electrical conductivity of the rinse water entering the toilet bowl during the flush and the refill operations. The rinse water detector assembly 36 comprises dual sensor probes 55 which are electrically conductive and preferably fabricated of either stainless steel or of a corrosion resistant material. The dual sensor probes 55 are mounted on a flexible, adhesively-backed, non-electrically-conductive back-plate 56. Any non-electrically-conductive surface would be operationally sufficient for mounting the dual sensor probes 55, however, the contour-formable back-plate 56 facilitates positioning of the dual sensor probes 55 within the water flow-path of the rinse water entering the toilet bowl. The dual sensor probes 55 are fitted with electrical wire segments which are terminated with an electrical disconnect plug 57, thereby simplifying installation and replacement of the rinse water detector assembly 36.

Upon operation of the rinse water lever 14, the electrically conductive characteristic of water flowing across the rinse water dual sensor probes 55 will shunt resistor 50 with significantly less resistance, thereby decreasing the voltage at the inverting input of comparator amplifier 45. Instead of the normal 8 vdc, the comparator amplifier 45 inverting input will now have less positive voltage than that of the non-inverting input. Therefore, with water flowing past the rinse water detector dual probes 55, the output of comparator amplifier 45 will go positive and allow transistor base-bias resistor 51 to draw base current. Activation of base current causes NPN switching transistor 46 to supply electric current to the flow-control solenoid valve 29. The flow-control solenoid valve 29 energizes, thereby releasing, by gravity feed, chemical additive through fluid conduction tubing 28 to a user-adjusted flow-metering valve 31. The chemical additive is further directed to the RV toilet 10 via. fluid conduction tubing 28 and, finally, to a toilet bowl orifice 32.

The NPN switching transistor 46 will continue to conduct electric current and the flow-control solenoid valve 29 will stay energized as long as flush water continues to enter the toilet bowl through the rinse water aperture 16.

The high input impedance of integrated comparator amplifier 45 allows the Wheatstone Bridge resistors 47, 48, 49, and 50 to be of high resistances. Resistance values of 100 k ohms for resistors 47 and 48, while resistors 50 and 49 having 100 k ohms and 47 k ohms respectively will provide reliable performance. The resultant high resistance of the Wheatstone bridge, CMOS construction of the integrated comparator amplifier 45, and normally-off condition of the NPN switching transistor 46 ultimately yields low energy consumption. Additionally, as a result of the overall high input impedance of the integrated comparator amplifier 45, flush water detection currents are very low, safe, and cause minimal deterioration of the rinse water dual sensor probes 55. Electrolytic capacitors 52 and 53 serve to keep any noise transients on the inputs of comparator amplifier 45 from causing spurious activations of the flow-control solenoid valve 29. Diode 54 serves to dampen induced voltages produced by the coil of flow-control solenoid valve 29, thereby protecting the NPN switching transistor 46 collector junction.

As shown in FIG. 1, the integrated comparator amplifier 45 is additionally equipped with a fluid prime switch 58. The momentarily actuated fluid-prime switch 58 consists of an electric contact-switch connected as an electrical bypass to the rinse water detector assembly 36, thereby momentarily simulating the detection of the flush and the refill operations. The fluid prime switch 58 is a momentary push button style switch which can be seen connected across the rinse water detector wires 37. Activating the fluid prime switch 58 simulates the detection of rinse water entering the toilet bowl by shunting electronic control unit resistor 50. The fluid prime switch 58 is used to prime the fluid conduction tubing 28 with liquid chemical additive without operating the rinse water lever 14, and consequently wasting water. As stated for the fluid reservoir 17, the fluid conduction tubing 28 should preferably be made of transparent material, thereby providing effortless inspection of the priming process. The fluid prime switch 58 can also be considered a confidence test-switch as it effectively tests the entire invention except for the rinse water detector assembly 36 and associated wires 37. Another use of the fluid prime switch 58 would be to make adjustments to the flow-metering valve 31 without wasting water.

From the description above, a number of advantages of my chemical dispensing apparatus for RV toilets become evident:

(a) By utilizing electrically conductive probes to passively detect the flush or refill operation, a chemical dispensing apparatus can be installed without modifying the existing RV plumbing system or toilet.

(b) Utilizing gravity feed to make an in-air, direct-drop of liquid chemical additive to the RV toilet bowl ensures the impossibility of contaminating the RV fresh water supply source.

(c) Utilizing gravity feed and in-air direct drop of liquid chemical additive yields simplicity in design wherein one-way check valves, mixing canisters and rigidly constructed, bulky, high pressure plumbing components become unnecessary.

(d) Utilizing low pressure, gravity-fed fluid conduction allows the implementation of flexible tubing and lighter materials in component fabrication, thereby yielding installation options such as liberal location of component modules.

(e) Utilization of a continually adjustable flow-metering valve allows convenient, positive control of liquid chemical additive released to the RV toilet bowl.

(f) Utilizing such constant as gravity feed, instead of the non-linear means presented by chemical dilution in mixing canisters, provides a more dependable concentration of chemical additive, eventually accumulated in the holding tank.

(g) Utilizing an electronic control unit easily accommodates enhancements such as simple on/off and fluid priming switches.

(h) Utilizing modern solid-state technology provides low energy consumption, power selection options, and the safety of low voltages and currents.

OPERATION—FIG. 1

The automatic liquid chemical dispenser is operable after verifying the presence of liquid chemical in the fluid reservoir 17. At the electronic control unit 33, the user selects either ac voltage or dc voltage adapter at power selection switch 38. The dispenser is then energized by operating power switch 44. If the fluid reservoir was found depleted of liquid chemical additive, the user may wish to prime the dispensing system by pressing the fluid prime switch 58 while observing fluid flow into the bowl of the RV toilet 10. The user may also make adjustments to the flow-metering valve 31 while pressing the fluid prime switch 58. At this point, chemical dispenser is fully functional and will automatically actuate whenever the RV toilet is either prefilled or flushed.

I claim as my invention:

1. An adapter for dispensing liquid chemical additive into the bowl of a toilet installed in a recreational vehicle, said recreational vehicle comprising motorhomes, travel trailers and marine craft, wherein said toilet installed in a recreational vehicle is connected to a pressurized fresh water supply, said toilet having a flush system comprising a rinse water valve for admitting fresh water into said bowl and a flush valve for the release of waste from said bowl into a waste holding tank, said liquid chemical additive dispensing adapter comprising:

a. a fluid reservoir for containment of liquid chemical additive, said fluid reservoir comprising a container capable of holding enough liquid chemical additive to accommodate chemical treatment for numerous anticipated flushes and bowl refill operations of said toilet installed in a recreational vehicle, said fluid reservoir additionally comprising a fluid shut-off valve, integrally incorporated within the base of said fluid reservoir;

b. a flow-control solenoid valve for releasing said liquid chemical additive by gravity feed to said bowl of said toilet installed in a recreational vehicle, said flow-control solenoid valve comprising an electrically operated, electro-magnetically actuated, fluid control valve;

c. a rinse water detector assembly for detecting the flush and the refill operations of said toilet installed in a recreational vehicle, wherein said rinse water detector assembly comprises a plurality of electrically conductive probes positioned within the flow-path of the water entering said bowl of said toilet, said detection of the flush and the refill operations is dependent upon the electrical conductivity of fresh water entering said bowl of said toilet;

d. a flow-metering valve for adjusting the desired amount of liquid chemical additive released by said flow-control solenoid valve, said flow-metering valve comprising a continuously adjustable, variably restricting fluid-conductive valve, thereby providing flow-rate control of liquid chemical additive released to said bowl of a toilet installed in a recreational vehicle;

e. an electronic control unit for activation and deactivation of said flow control solenoid valve as the result of said detection of the flush and the refill operations of said toilet installed in a recreational vehicle, said electronic control unit employing electronic amplifying circuitry, whereby sufficient electrical energy is controlled for the activation and deactivation of said flow control solenoid valve;

f. in combination, a bowl orifice positioned at said bowl of said toilet installed in a recreational vehicle and fluid conduction tubing means for communicating liquid chemical additive by gravity feed from said fluid shut-off valve, to said flow-control solenoid valve, from said flow-control solenoid valve to said flow-metering valve and from said flow-metering valve to said bowl orifice.

2. An adapter according to claim 1 wherein said fluid reservoir, said flow-control solenoid valve, said flow-metering valve, and said electronic control unit are packaged with drilled-hole flanges, thereby facilitating their ability to be surface mounted.

3. An adapter according to claim 1 wherein said fluid reservoir is provided a refill cap assembly, comprising a removable refill cap, integrally formed with a tubular, upwardly-directed cap extension of said removable refill cap, whereby said cap extension ensures fluid containment by dissipating fluid turbulence, while providing air displacement to said fluid reservoir.

4. An adapter according to claim 3 wherein said refill cap assembly additionally comprises a cap seal, integrally formed with a cap seal extension, said cap seal extension having a drillway through its center, said cap seal extension directed downward, toward the liquid chemical additive contents of said fluid reservoir, whereby is provided the combination of assured containment of liquid chemical additive, attenuation to fluid turbulence, and completion of said air displacement to said fluid reservoir.

5. An adapter according to claim 1 wherein said rinse water detector assembly comprises a plurality of electrically conductive probes mounted on an adhesively-backed, non-electrically-conductive back-plate.

6. An adapter according to claim 5 wherein said rinse water detector assembly plurality of electrically conductive probes are fitted with electrical wire segments which are terminated with an electrical disconnect plug, thereby simplifying installation and replacement of said rinse water detector assembly.

7. An adapter according to claim 1 wherein said bowl orifice of said fluid conduction tubing means is provided with an adhesively-backed mounting surface.

8. An adapter according to claim 1 wherein said electronic control unit is provided with a momentarily actuated fluid-prime switch consisting of a contact-switch connected as an electrical bypass to said rinse water detector assembly electrically conductive probes, thereby momentarily simulating said detection of the flush and the refill operations.

9. An adapter according to claim 1 wherein said electronic control unit is provided a power selection switch for selecting input power source from either 115 vac-to-12.6 vac wall-plug-mounted transformer adapter or from a 12 vdc cigarette lighter voltage source adapter.

10. An adapter according to claim 1 wherein said electronic control unit is provided a power switch for delivering direct-current voltage, as selected by said power selection switch, to said electronic control unit amplifying circuitry, thereby providing a means for enabling and disabling the release of liquid chemical additive.

11. An adapter according to claim 1 wherein said bowl orifice of said fluid conduction tubing means is provided as a formable bowl orifice, for contouring to the owner's satisfaction.

12. An adapter according to claim 1 wherein said fluid reservoir and said fluid conduction tubing means are fabricated of transparent materials, whereby the inspection of liquid chemical additive level in said fluid reservoir and the monitoring of priming said fluid conduction tubing means are facilitated.

\* \* \* \* \*